United States Patent [19]

Chew et al.

[11] Patent Number: 5,576,528
[45] Date of Patent: Nov. 19, 1996

[54] COLOR PROCESSING FOR BAR CODE SYMBOL COMPACTION

[75] Inventors: Steven M. Chew, Northport; Sundeep Kumar, East Setauket; Michael O'Haire, Smithtown, all of N.Y.

[73] Assignee: Symbol Technologies, Inc., Bohemia, N.Y.

[21] Appl. No.: 363,472

[22] Filed: Dec. 23, 1994

[51] Int. Cl.⁶ ........................................................ G06F 7/12
[52] U.S. Cl. ................................................................. 235/469
[58] Field of Search ..................................... 235/469, 494

[56] References Cited

U.S. PATENT DOCUMENTS

| | | |
|---|---|---|
| 3,637,993 | 1/1972 | Christie et al. |
| 3,738,263 | 6/1973 | Combs et al. |
| 3,810,423 | 5/1974 | Hansen et al. |
| 3,844,210 | 10/1974 | Allais |
| 3,858,506 | 1/1975 | Frost |
| 4,443,694 | 4/1984 | Sanford |
| 4,488,679 | 12/1984 | Bockholt ............................. 235/469 |
| 4,834,541 | 5/1989 | Yamaba |
| 4,856,820 | 8/1989 | Kasprzak et al. |
| 4,964,696 | 10/1990 | Suzuki et al. |
| 5,009,531 | 4/1991 | Koike |
| 5,118,369 | 6/1992 | Shamir |
| 5,129,974 | 7/1992 | Aurenius |
| 5,216,498 | 6/1993 | Matsunawa et al. |
| 5,304,786 | 4/1994 | Pavlidis et al. |
| 5,344,244 | 9/1994 | Fukahori et al. |
| 5,369,261 | 11/1994 | Shamir |
| 5,410,502 | 4/1995 | Bird |

*Primary Examiner*—Harold Pitts

[57] ABSTRACT

A method and apparatus for increasing the information density of a bar code symbol by generating multiple constituent bar code symbols, wherein each one is formed in a different color selected from a group of various primary colors, and overlaying each differently colored symbol on top of each other, thus forming an aggregate bar code symbol of various colors. In areas where the differently colored bars overlap each other, colors distinct from those in the original group of colors are formed. The aggregate bar code symbol is scanned by a solid state imaging device, and the scanned image is resolved by image processing techniques into the three constituent bar code symbols of the various colors. Each bar code symbol is then individually processed and decoded in accordance with the particular symbology used to encode the constituent bar code symbols. As a result of the present invention, multiple bar code symbols are printed in the space normally required by one bar code symbol, and each constituent symbol is separated by color resolution and decoded to form the original data. Thus, the information density of the bar code system is increased without the need for a new symbology. In addition, a single bar code symbol may be divided into multiple portions of substantially the same size and printed substantially over each other in different colors, thus producing a single compacted bar code symbol with increased information density. The compacted bar code symbol may be recovered by scanning and resolving the symbol back into its constituent portions, concatenating the portions together, and decoding the resulting bar code symbol in accordance with standard techniques.

20 Claims, 8 Drawing Sheets

SUBTRACTIVE COLORS
PRIOR ART
FIG. 1A

ADDITIVE COLORS
PRIOR ART
FIG. 1B

ORIGINAL SYMBOL (n ROWS)

CYAN PORTION (n/3 ROWS)

MAGENTA PORTION (n/3 ROWS)

YELLOW PORTION (n/3 ROWS)

COMPACTED SYMBOL (n/3 ROWS)

COLOR PROCESSING FOR BAR CODE SYMBOL COMPACTION

BACKGROUND OF THE INVENTION

1. Field of the Invention

This invention relates to the compaction of data encoded into bar code symbols, and in particular to the use of color processing to combine a plurality of bar code symbols into an aggregate bar code symbol and to separate and decode the constituent bar code symbols subsequent to scanning the aggregate symbol via color imaging techniques.

2. Description of Related Art

Bar codes have become broadly accepted as a means for automatically identifying objects. A bar code symbol is a pattern of parallel bars and spaces of various widths that represent data elements or characters. The bars represent strings of binary ones and the spaces represent strings of binary zeros. Generally, the bars and spaces can be no smaller than a specified minimum width which is called a "module" or "unit." The bars and spaces are multiples of this module size or minimum width.

The conventional bar code symbol is "one-dimensional" in that the bars and spaces extend only in a single direction. There has been an increasing need, however, for machine-readable symbols that contain more information than conventional bar code symbols. One approach for increasing the information in machine-readable symbols is to reduce the height of the bar codes and stack the bar codes one on top of each other to create a "stacked" or "two-dimensional" bar code. One such two-dimensional bar code is PDF417, which was developed by Symbol Technologies, Inc. The PDF417 symbology utilizes a variable number of codewords which are discrete representations of data. A complete description of the PDF417 code is contained in U.S. Pat. No. 5,304,786, which is assigned to the same assignee as the present invention and which is incorporated by reference herein. Other two dimensional bar code symbologies include Code 1 and Maxicode, which are referred to as matrix codes.

Devices for scanning bar codes are well known in the art, and typically fall into one of two categories; laser and solid state imagers such as charge-coupled devices (CCDs). Laser scanners comprise a visible laser diode for emitting a laser beam, a scanning component such as an oscillating mirror for sweeping the laser beam in a horizontal and/or raster pattern across the bar code, and collection optics including a photosensor for sensing the light reflected off the target bar code and converting the light energy into an analog electrical signal, the amplitude of which corresponds to the reflectivity of the target bar code. The analog signal is processed, digitized and decoded into data representative of that which had been encoded into the target bar code.

CCD based bar code readers are either one-dimensional or two-dimensional. One-dimensional CCD bar code scanners use a linear array of photosensors to capture an image of a cross section of the entire linear bar code at once and produce an analog waveform whose amplitude is representative of the darkness and lightness of the bars and spaces of the captured image. The electric charge stored in each element of the CCD array as a function of the amount of light sensed by an area covered by each element is shifted out serially to form electric signals for further processing, digitizing and decoding. Two dimensional CCD bar code readers operate similarly to capture an image of an entire two-dimensional bar code symbol at once and process it accordingly. Advantageously, image processing techniques allow such a CCD array to be used to read misoriented bar code symbols. For example, U.S. Pat. No. 5,319,181, issued to the assignee of the present invention, describes a technique to implement a CCD camera to capture a two-dimensional PDF417 symbol, store the image data in memory, and perform virtual scanning of the image data to determine the proper orientation of the symbol and enable successful decoding. The waveform is digitized and decoded in a means similar to laser scanners.

Two-dimensional CCD arrays may also be used to capture the image of a linear bar code for processing, digitizing and decoding. In addition, linear CCD arrays may be used to capture the image of a two-dimensional bar code symbol on a row-by-row basis, where the linear array is mechanically or optically scanned down across the rows of the two-dimensional symbol.

Due to the binary nature of bar codes (i.e. the representation of logical 1's and 0's), both linear bar codes and two-dimensional bar code symbols are printed in two highly contrasting colors, which optimally are black bars printed on a white substrate such as a sheet of paper. The white spaces between the black bars provides a high contrast so that the bar/space edges can be readily detected by the scanner, and digitized and decoded in accordance with the particular symbology implemented. In some cases, product packaging dictates that different color pairs be used; e.g. on some beverage cans, gold and/or red may be used. In all cases, however, two contrasting colors are used to designate the two possible states of information being conveyed by the units of the bar code.

It is a continuous goal to be able to increase the information density of bar code symbols in order to store and convey more information in a given area. In particular, it is desired to use the varying optical properties of colors other than black and white in order provide increased information density in bar code printing and reading.

Multi-colored bar code systems have been proposed in the past. For example, U.S. Pat. No. 3,637,993 discloses a transition code recognition system which uses a three color bar code in which transitions from a first color to a second color, from the second color to a third color, and from the third color to the first color manifest a first binary value, and in which transitions from the third color to the second color, from the second color to the first color, and from the first color to the third color manifest a second binary value. This bar code symbology is therefore transition or edge defined, and does not take advantage of other colors in the spectrum. While this prior art system might be extended to include other colors, such an extension would require the definition of an entirely new symbology and would have to supplant existing symbologies which are popular and in extensive commercial use.

It is therefore an object of the present invention to provide a bar code system with increased information density over existing systems.

It is a further object of the present invention to use multiple colors in a bar code system in order to obtain such increased information density.

It is a further object of the present invention to provide such a bar code system which uses multiple colors to increase information density without requiring a new symbology and which can be used in conjunction with any desired symbology.

It is an even further object of the present invention to provide such a bar code system which uses multiple colors as a means for compacting multiple bar code symbols into an aggregate bar code symbol with increased information density and which has a reading means for separating the aggregate bar code symbol back into its constituent bar code symbols for subsequent decoding thereof.

It is a still further object of the present invention to provide such a bar code system which uses multiple colors as a means for compacting a single bar code symbol into a smaller area and which has a reading means for unpacking the compacted single bar code symbol back into its original format for subsequent decoding thereof.

SUMMARY OF THE INVENTION

In accordance with these and other objects, provided is a method and apparatus for increasing the information density of a bar code symbol by generating multiple constituent bar code symbols, wherein each constituent bar code symbol is encoded with bars of a different color selected from a group of various primary colors, and overlaying each differently colored symbol on top of each other, thus forming an aggregate bar code symbol of various colors. In areas where the differently colored bars overlap each other, secondary colors distinct from the original group of primary colors are formed. The aggregate bar code symbol is scanned by a solid state imaging device, and the scanned image is resolved by image processing techniques into the three constituent bar code symbols of various primary colors. Each bar code symbol is then individually processed and decoded in accordance with the particular symbology that was used to encode the constituent bar code symbols. As a result of the present invention, multiple bar code symbols may be overlaid in the space normally required by only one bar code symbol, and each constituent bar code symbol is separated by color resolution techniques and decoded to form the original data. Thus, the information density of the bar code system is increased without the need for a new symbology.

In particular, a preferred embodiment illustrated herein uses the primary colors cyan, magenta and yellow from the CMY subtractive color model for printing an aggregate bar code symbol and then uses the primary colors red, green and blue from the RGB additive color model for resolving the imaged aggregate symbol into the three constituent bar code symbols. In this embodiment, one of three constituent bar code symbols is printed on a white substrate in cyan, a second of the three constituent bar code symbols is printed in magenta substantially over the first bar code symbol on the white substrate, and the remaining constituent bar code symbol is printed in yellow substantially over the first two bar code symbols on the white substrate. An aggregate bar code symbol is thus formed which, depending on the overlap of the various bars and spaces of the three constituent bar code symbols, has sections in the colors white, cyan, magenta, yellow, blue (cyan and magenta), red (magenta and yellow), green (cyan and yellow) and black (cyan, magenta and yellow). The aggregate bar code symbol is scanned by a CCD imaging device, which illuminates the aggregate bar code symbol with white light and collects the reflected light through red, green and blue filters in successive imaging passes. Thus, when the aggregate bar code symbol is imaged with a red filter, a red and black space/bar pattern is formed which represents the first constituent bar code symbol; when the aggregate bar code symbol is imaged with a green filter, a green and black space/bar pattern is formed which represents the second constituent bar code symbol; and when the aggregate bar code symbol is imaged with a blue filter, a blue and black space/bar pattern is formed which represents the third constituent bar code symbol. Each of the constituent bar code symbols is then processed and decoded in accordance with the particular symbology used in order to obtain the originally encoded data.

The present invention is applicable to virtually every type of bar code symbol, whether linear or two-dimensional. Moreover, in addition to combining multiple bar code symbols into an aggregate bar code, the present invention may be used to compact a single bar code symbol into a smaller space by first dividing the bar code symbol into portions of substantially the same size and printing each portion in a distinct color on top of each other. The resulting bar code symbol will have increased information density since it will carry the originally encoded information in a smaller area. A bar code reading device is then used to scan the compacted bar code and resolve the image into its constituent colored portions. The portions are concatenated back to the original bar code symbol format and decoded in accordance with standard techniques. This method is applicable to reducing the vertical dimension of a PDF417 two-dimensional symbol or the horizontal dimension of a linear bar code.

DETAILED DESCRIPTION OF THE PREFERRED EMBODIMENTS

The preferred embodiment of the present invention will now be described in detail. The present invention implements advantageously the ability to combine primary colors for generating and printing an aggregate bar code symbol, as well as the ability to electronically image and separate the combined colors by using primary colored filters or other color separation techniques well known in the art. As such, multiple bar codes can be overlaid atop one another to increase the information carrying density of a given substrate area, and the constituent bar codes can be resolved and decoded during the bar code scanning process.

Figure 1A:
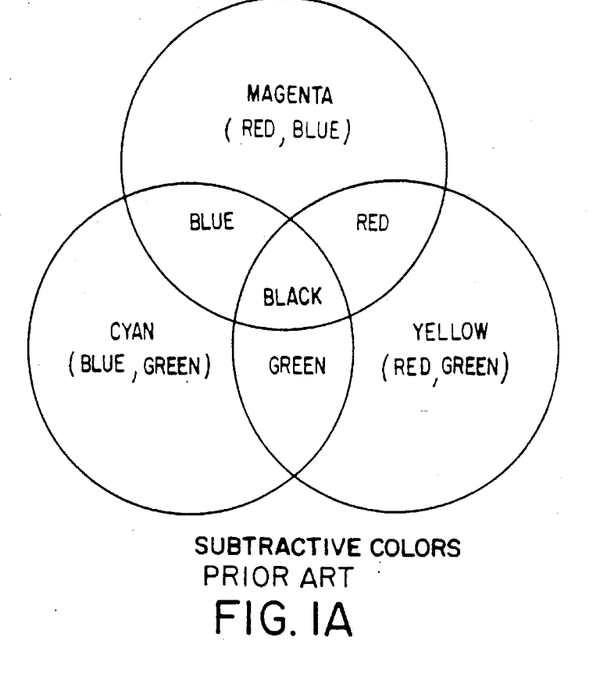
FIG. 1A is a prior art CMYK color chart illustrating the subtractive relationship of the printing primary colors cyan, magenta and yellow.

Referring to FIG. 1a, it is well known in the art of color priming that the primary colors cyan (blue-green), magenta (red-blue), and yellow (red-green) can be combined with each other in varying degrees to form any desired color for printing on a substrate. When used with pigments, these colors exhibit subtractive properties which allow light of certain wavelengths to be reflected and which absorb other wavelengths, thus giving the observer the impression of a certain color. Thus, when white light is incident, the color cyan will reflect blue and green wavelengths but will absorb red, the color magenta reflects red and blue wavelengths but absorbs green, and the color yellow reflects red and green wavelengths but will absorb blue. Importantly, when cyan and magenta are combined, only blue wavelengths are reflected and both red and green are absorbed; when magenta and yellow are combined, only red wavelengths are reflected and both green and blue are absorbed; and when cyan and yellow are combined, only green is reflected and both red and blue are absorbed. Thus, in modem printing applications, a color picture to be printed is first resolved into its cyan, magenta and yellow components, and each color is printed onto the substrate in one of three successive passes to attain the desired result.

Notably, by combining all three colors magenta, cyan and yellow, no light is reflected, which results in the "color" black. Experience teaches, however, that due to imperfections in pigments and the like, the color black obtained by simply mixing the three primary colors is not a true black. Thus, many printing processes utilize a specially pigmented black ink in a separate printing pass rather than merely combing the primary colors. This process results in what is known as a CMYK color model.

Figure 1B:
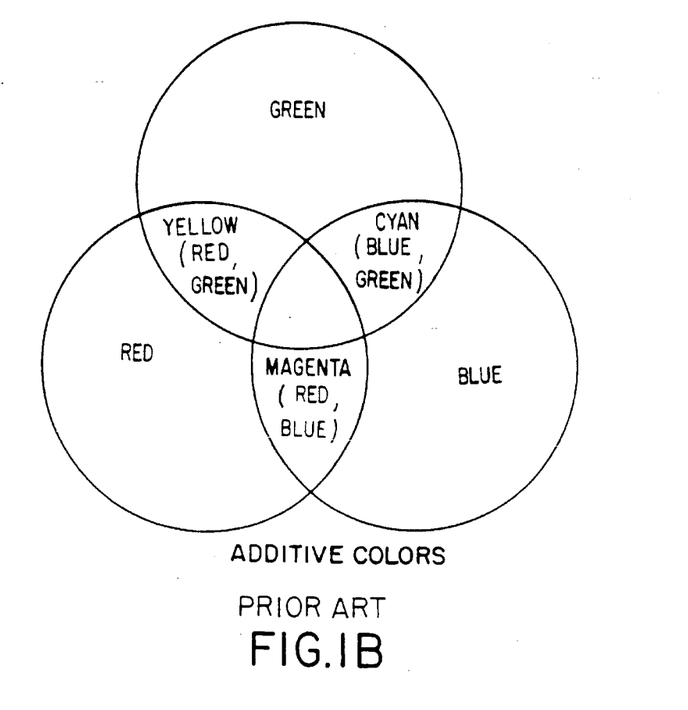
FIG. 1B is a prior art RGB color chart illustrating the additive relationship of the light primary colors red, green and blue.

FIG. 1b illustrates what is known in the art as the RGB color model, in which light of the colors red, green, and blue may be combined to form any desired color. Since light of a particular wavelength does not absorb other wavelengths, this is an additive rather than a subtractive model of color combination. Thus, when red and green light are combined, yellow light results; when red and blue are combined, magenta results; and when green and blue are combined, cyan results. When red, green and blue wavelength light are combined, white light results. In the additive color model, the "color" black is the absence of any light wavelengths.

Figure 2:
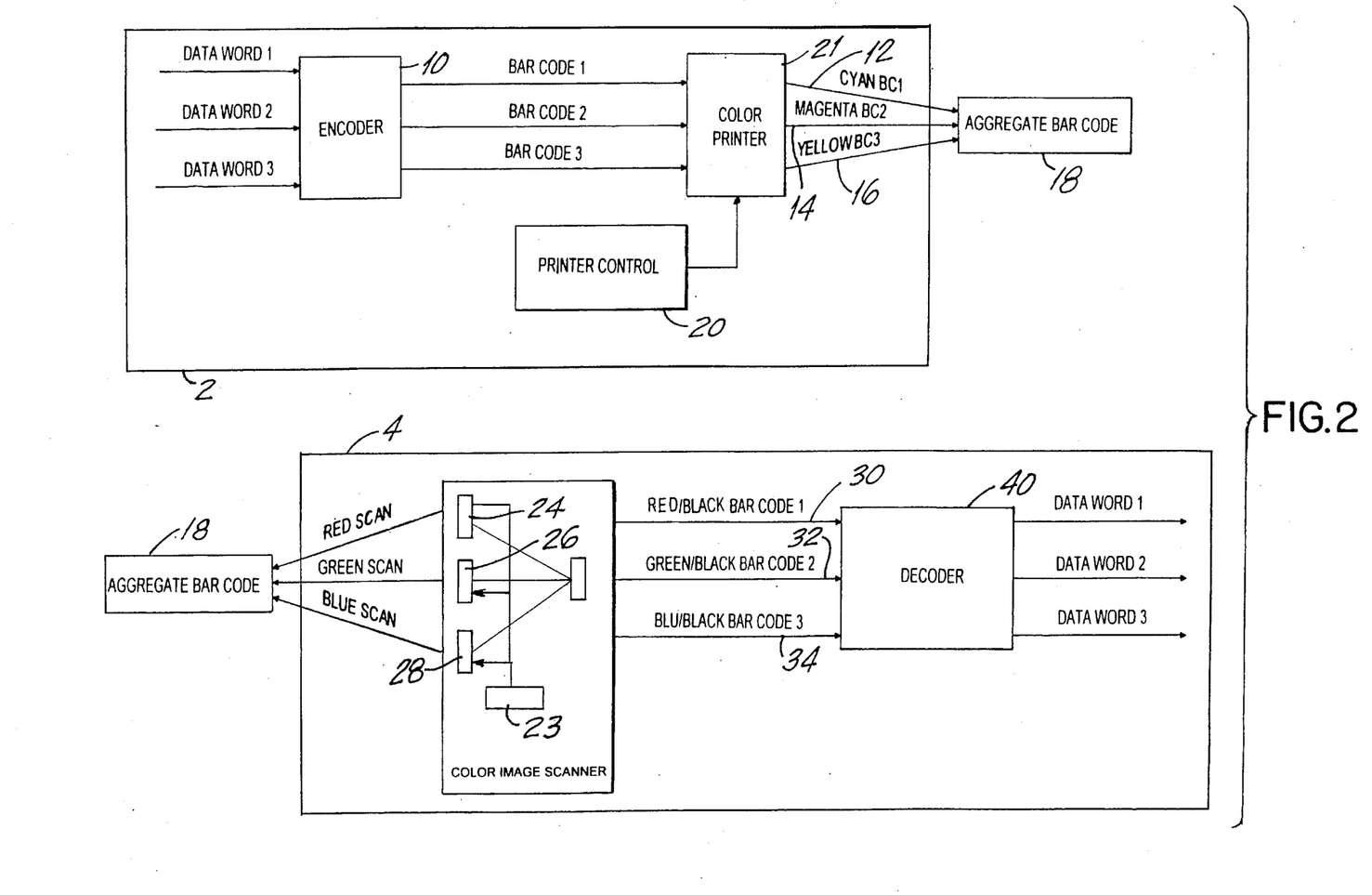
FIG. 2 is a block diagram of the preferred embodiment system of the present invention for using color processing to compact three bar code symbols.

The preferred embodiment of the bar code generating and imaging system 1 of the present invention implements both the CMY color model for generating an aggregate bar code from three constituent bar codes and the RGB color model for resolving the aggregate bar code back into the three constituent bar codes when scanning. Referring to FIG. 2, a functional block diagram of the system 1 of the present invention is shown. The system comprises a color compacted bar code generation means 2 and a color compacted bar code reading means 4. The bar code generation means 2 comprises an encoder 10, a printer control means 20, and a color printer 21. Three data words DATA WORD 1, DATA WORD 2, and DATA WORD 3 are encoded by the conventional bar code encoding means 10 to three constituent bar codes designated BAR CODE 1, BAR CODE 2, and BAR CODE 3 in accordance with the particular symbology desired. For illustrative purposes only, BAR CODE 1 has the binary format 01010101, BAR CODE 2 has the binary format 00110011, and BAR CODE 3 has the binary format 00001111, as shown in FIG. 3.

Under the conventional prior art methods of printing bar codes, the 0's are represented by (white) spaces, and the 1's are represented by black bars. In the preferred embodiment of the present invention, however, each of the three constituent bar codes is printed on a white paper substrate by using the colors cyan, magenta and yellow, respectively. Thus, printer control means 20 instructs the color printer 21 to print CYAN BC1 12 on a certain location on the white substrate, then instructs the color printer 21 to print MAGENTA BC2 14 over substantially the same location on the white substrate, and finally instructs the color printer 21 to print YELLOW BC3 16 over the substantially same location on the white substrate. The CYAN BC1 comprises white spaces 12a, 12c, 12e, 12g, and cyan bars 12b, 12d, 12f, 12h. The MAGENTA BC2 14 comprises white spaces 14a, 14c and magenta bars 14b, 14d. The YELLOW BC3 16 comprises white space 16a and yellow bar 16b.

Figure 3:
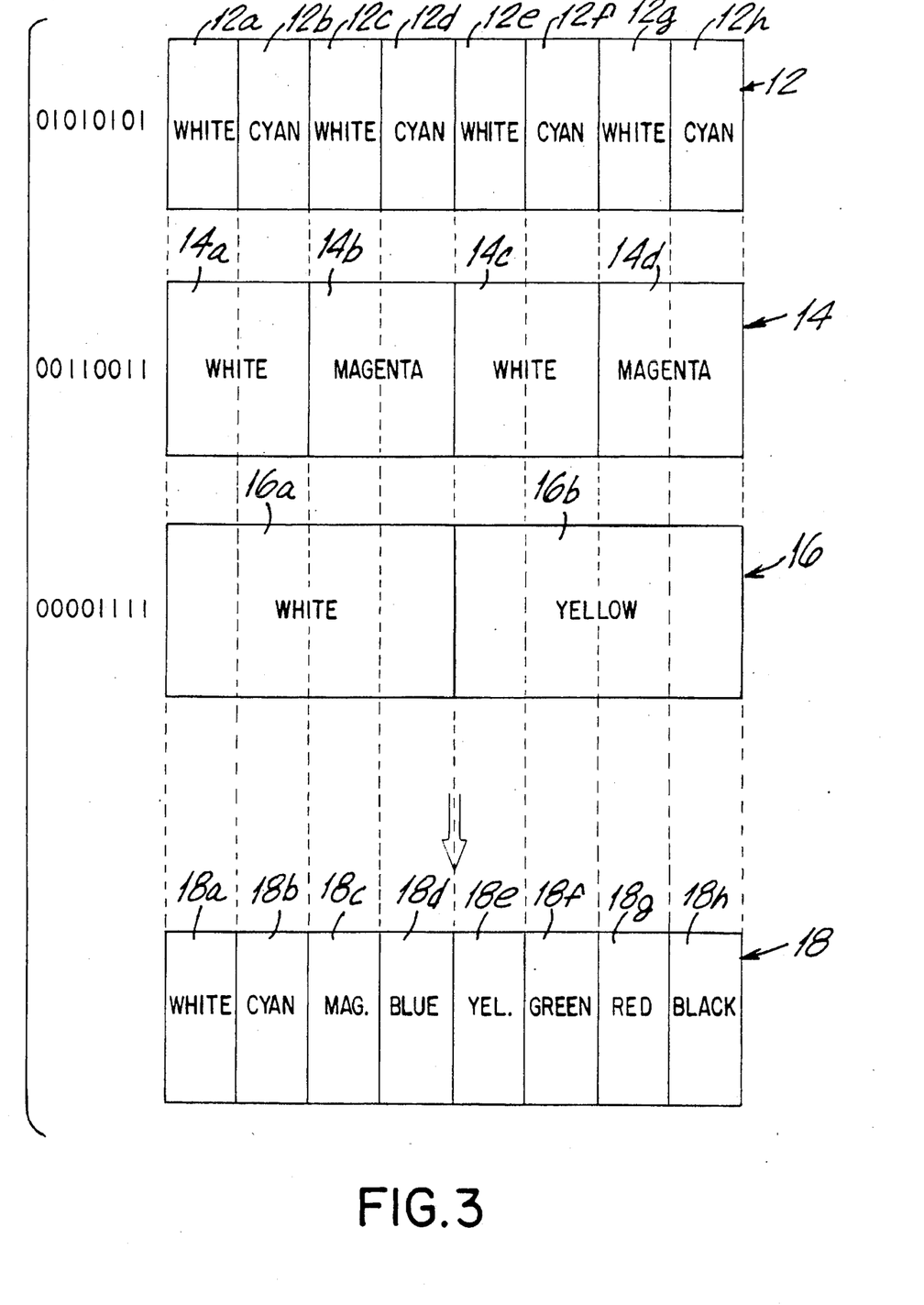
FIG. 3 is an illustration of the color compaction of three constituent linear bar codes into an aggregate color-coded bar code.

As shown in FIG. 3, an aggregate bar code 18 comprising various sections 18a, 18b, 18c, 18d, 18e, 18f, 18g, and 18h is formed. The white section 18a is the overlapping combination of white spaces 12a, 14a and 16a. The cyan section 18b is a combination of the cyan bar 12b and the white spaces 14a and 16a. The magenta section 18c is a combination of the white space 12c, the magenta bar 14b, and the white space 16a. The blue section 18d is a combination of the cyan bar 12d, the magenta bar 14b, and the white space 16a. The yellow section 18e is a combination of the white spaces 12e and 14c and the yellow bar 16b. The green section 18f is a combination of the cyan bar 12f, the white space 14c and the yellow bar 16b. The red section 18g is a combination of the white space 12g, the magenta bar 14d, and the yellow bar 16b. The black section 18h is the combination of the cyan bar 12h, the magenta bar 14d, and the yellow bar 16b. Optionally, the black section 18h may be formed by printing with a separate pass of black ink in a CYMK printing process.

Thus, the aggregate bar code 18 comprises combined sections of the three constituent bar codes 12, 14, 16 printed in the same space on the substrate. The amount of surface area taken up by the aggregate bar code 18 is substantially the same as that which would be taken up by any of the three constituent bar codes 12, 14 or 16, yet the aggregate bar code 18 contains three times as much information as any of the constituent bar codes.

Figure 4:
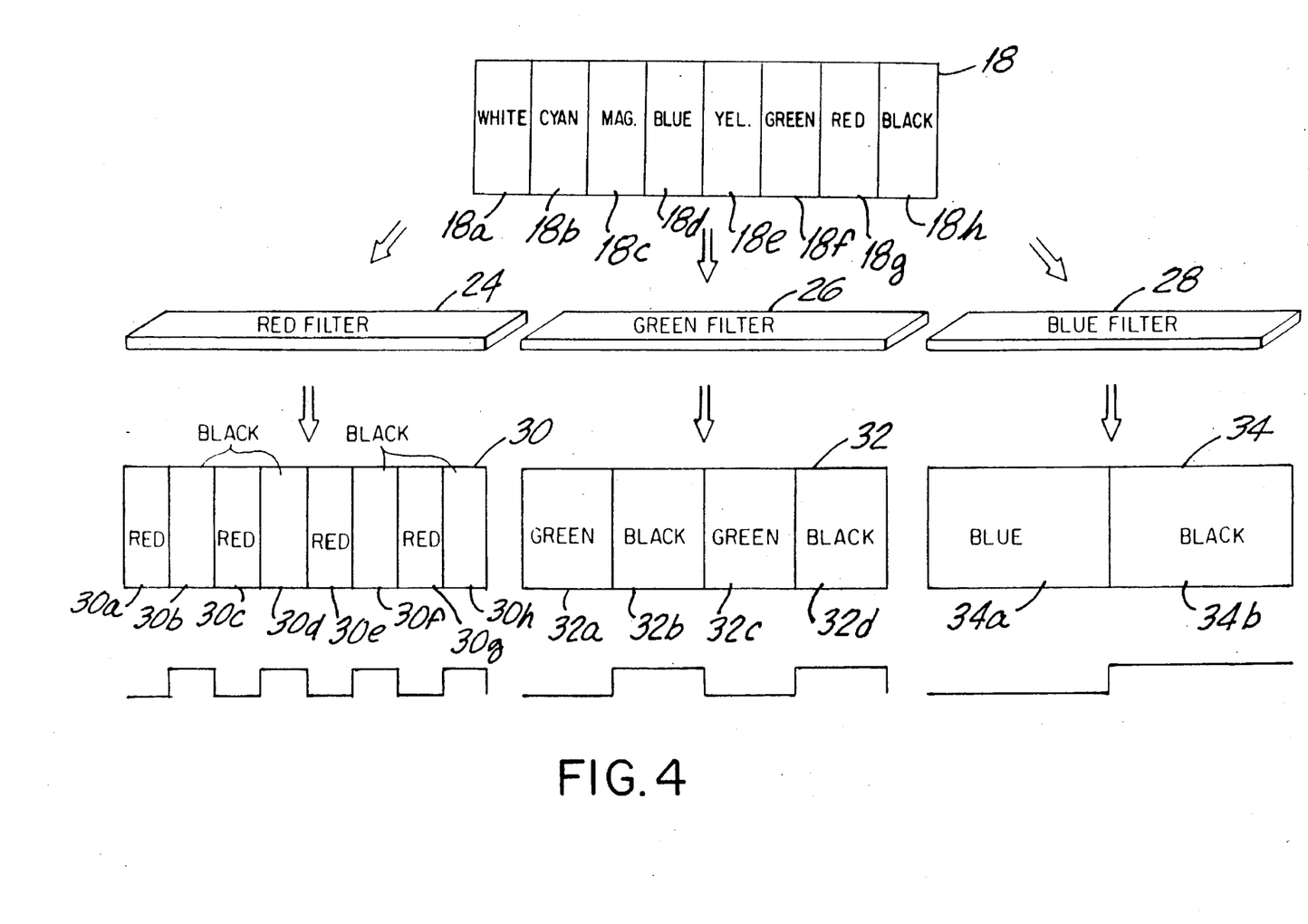
FIG. 4 is an illustration of the scanning and color separation of the aggregate color-coded bar code of FIG. 3 into the constituent linear bar codes.

The aggregate bar code 18 is then scanned, filtered and decoded by the color compacted bar code reading means 4, which comprises color processing means and bar code decoding means known in the art, as illustrated by FIG. 2. The aggregate bar code 18 is scanned by a color image scanner 22, which in the preferred embodiment is the PARAGON scanner marketed by MUSTEK, INC. Although this particular color image scanner is used in the preferred embodiment, any color imaging scanner capable of resolving the scanned image into three constituent primary colors may be used by the present invention. The scanner 22 scans the aggregate bar code 18 in three successive scanning passes, each time using a differently colored optical filter as shown in FIG. 4. As is well known in the art, the scanner 22 comprises a linear CCD array 29 which is passed over the image to be scanned, and an analog waveform is output by the CCD array 29 for each increment the CCD moves in relation to the image. A first scanning pass is made over the aggregate bar code 18 with a red filter 24, a second scanning pass is then made over the aggregate bar code 18 with a green filter 26, and a third scanning pass is made over the aggregate bar code 18 with a blue filter 28. The scanner comprises a filter changing mechanism 23 which functions to individually place each filter in the path of light reflected from the aggregate bar code 18 to the CCD array 29 in order to collect the desired wavelengths from the aggregate bar code 18.

Thus, when the red filter 24 is inserted in the optical path, the aggregate bar code 18 will be filtered in accordance with the RGB color model and will produce a RED/BLACK BAR CODE 30 as shown in FIG. 4. In particular, red wavelength light will be allowed to pass through the red filter 24 from the white section 18a, the magenta section 18c, the yellow section 18e, and the red section 18g of the aggregate bar code 18, all of which sections comprise light of red wavelength, to produce red spaces 30a, 30c, 30e and 30g. Since the cyan section 18b, the blue section 18d, the green section 18f and the black section 18h do not comprise light of red wavelength, the red filter 24 will block all light emitted from these sections and produce black bars 30b, 30d, 30f and 30g. The resulting RED/BLACK BAR CODE 30 is stored in memory for processing and decoding by the decoder 40.

When the green filter 26 is inserted in the optical path, the aggregate bar code 18 will be filtered in accordance with the RGB color model and will produce a GREEN/BLACK BAR CODE 32 as shown in FIG. 4. In particular, green wavelength light will be allowed to pass through the green filter 26 from the white section 18a, the cyan section 18b, the yellow section 18e, and the green section 18f of the aggregate bar code 18, all of which sections comprise light of green wavelength, to produce green spaces 32a and 32c. Since the magenta section 18c, the blue section 18d, the red section 18g and the black section 18h do not comprise light of green wavelength, the green filter 26 will block all light emitted from these sections and produce black bars 32b and 32d. The resulting GREEN/BLACK BAR CODE 32 is stored in memory for processing and decoding by the decoder 40.

When the blue filter 28 is inserted in the optical path, the aggregate bar code 18 will be filtered in accordance with the RGB color model and will produce a BLUE/BLACK BAR CODE 34 as shown in FIG. 4. In particular, blue wavelength light will be allowed to pass through the blue filter 26 from the white section 18a, the cyan section 18b, the magenta section 18c, and the blue section 18d of the aggregate bar code 18, all of which sections comprise light of blue wavelength, to produce blue space 34a. Since the yellow section 18e, the green section 18f, the red section 18g and the black section 18h do not comprise light of blue wavelength, the blue filter 28 will block all light emitted from these sections and produce black bar 34b. The resulting BLUE/BLACK BAR CODE 34 is stored in memory for processing and decoding by the decoder 40.

The decoder 40 operates in a fashion known in the art to decode the RED/BLACK BAR CODE 30, which has a bar/space pattern of 01010101 wherein the black bars represent 1's and the red spaces represent 0's. The decoder 40 scans through the appropriate space in memory to detect the bar/space transitions of the RED/BLACK BAR CODE 30 to produce the associated DATA WORD 1. If required, the red spaces may be converted to white spaces in accordance with standard image processing techniques in order to simplify the operation of the decoder 40.

Likewise, the decoder 40 operates in a fashion known in the art to decode the GREEN/BLACK BAR CODE 32, which has a bar/space pattern of 00110011 wherein the black bars represent 1's and the green spaces represent 0's. The decoder 40 scans through the appropriate space in memory to detect the bar/space transitions of the GREEN/BLACK BAR CODE 32 to produce the associated DATA WORD 2. If required, the green spaces may be converted to white spaces in accordance with standard image processing techniques in order to simplify the operation of the decoder 40.

Finally, the decoder 40 operates in a fashion known in the art to decode the BLUE/BLACK BAR CODE 34, which has a bar/space pattern of 00001111 wherein the black bars represent 1's and the blue spaces represent 0's. The decoder 40 scans through the appropriate space in memory to detect the bar/space transitions of the BLUE/BLACK BAR CODE 34 to produce the associated DATA WORD 3. If required, the blue spaces may be converted to white spaces in accordance with standard image processing techniques in order to simplify the operation of the decoder 40.

Thus, the original DATA WORD 1, DATA WORD 2 and DATA WORD 3 are recovered by the color compacted bar code reading means 4.

Other types of color image scanners may be used within the spirit and scope of the present invention. For example, recent types of color image scanners utilize a single scanning pass to read the image, wherein separate red, green and blue fluorescent light bulbs are strobed sequentially during the single pass to collect the red, green and blue data. This type of scanning technique is readily adapted to the present invention. In addition, color image scanners which utilize other types of color processing may be used, as long as the processing is capable of resolving the aggregate bar code into three constituent color bar codes with distinct bar space patterns representative of the constituent bar codes.

In addition, other types of color printers may be used within the spirit and scope of the present invention. For example, when combining a cyan bar code, a magenta bar code and a yellow bar code, thus forming an aggregate bar code comprising sections in the colors cyan, magenta, yellow, red, blue, green, black and and/or white, the constituent colored bar codes may be first logically combined in an imaging memory, thus producing a map of the respective color combinations which may be printed by any means available. Thus, if a printer is capable of individually printing each of the aforementioned component colors (cyan, magenta and yellow) as well as the combined colors (red, green, blue, black) with dedicated inks, ribbons and the like, then the combination of cyan, magenta and yellow inks on the print substrate to form red, blue and green sections of the aggregate bar code symbol may be eliminated in favor of the logical combination of the colors in memory prior to printing with dedicated inks.

The present invention is especially useful since it allows a user to triple the effective information density of any existing symbology, and does not require the user to reconfigure the existing encoding and decoding means already in use. Thus, by adding a color printer and configuring the printer to print three separate bar codes overlaying each other in the three primary colors, the aggregate bar code of the present invention may be readily generated. Further, by using a color image scanner with the capability to resolve the aggregate bar code into its constituent colored bar codes or translations thereof, the decoder presently in use may be used to decode each constituent bar code. Thus, the present invention-as presented herein is not a new symbology, but is a useful tool for compacting data of any symbology in use.

Moreover, although the present invention has been illustrated with use on a white substrate, it is contemplated that other color substrates may be used, as long as the various color combinations are selected to allow color resolution by the color image scanner to derive the original constituent bar codes.

Figure 5A:
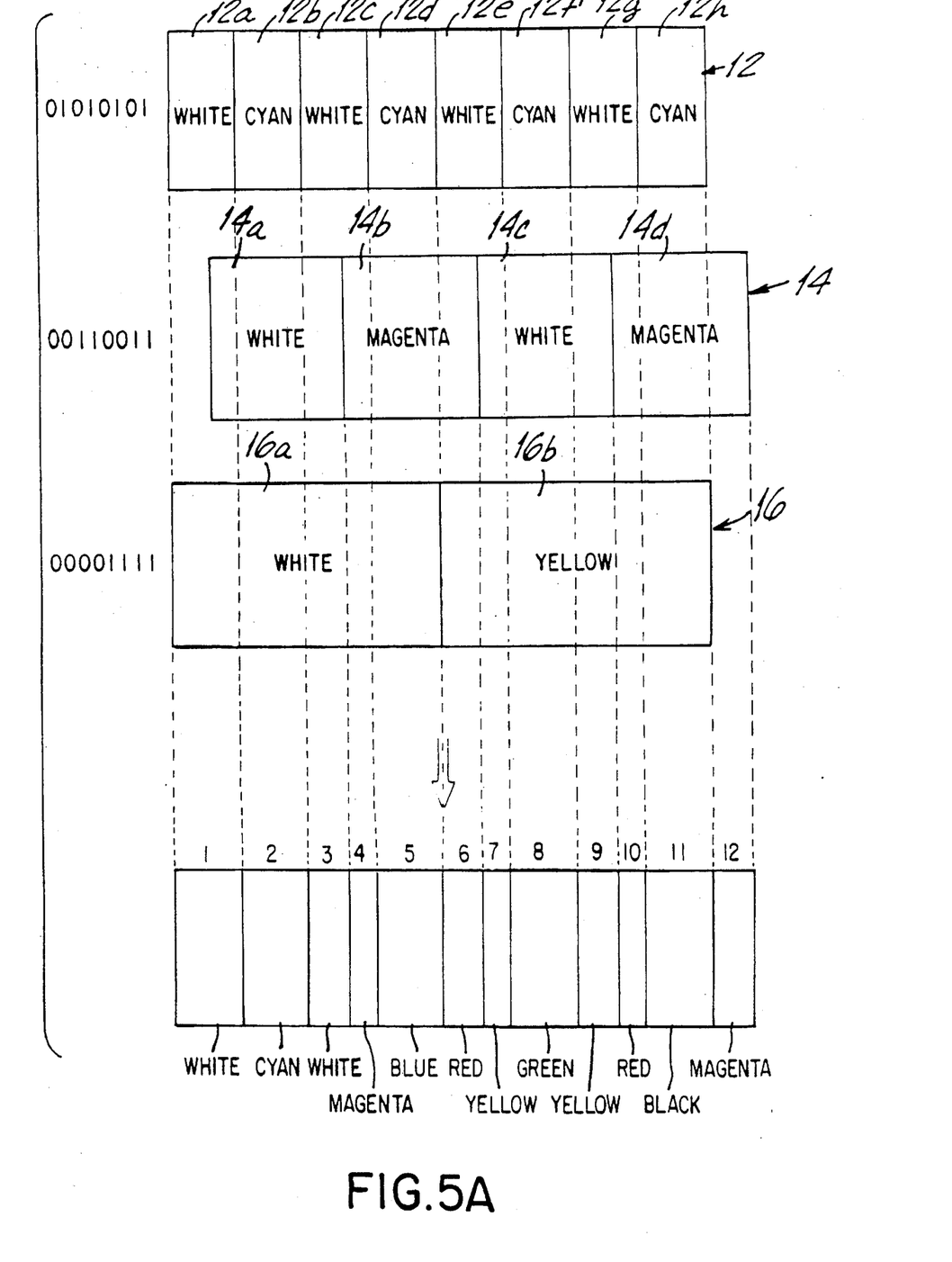
FIG. 5 is an illustration of misaligned color compaction of three constituent bar codes and the color separation of the resulting aggregate bar code symbol.
Figure 5B:
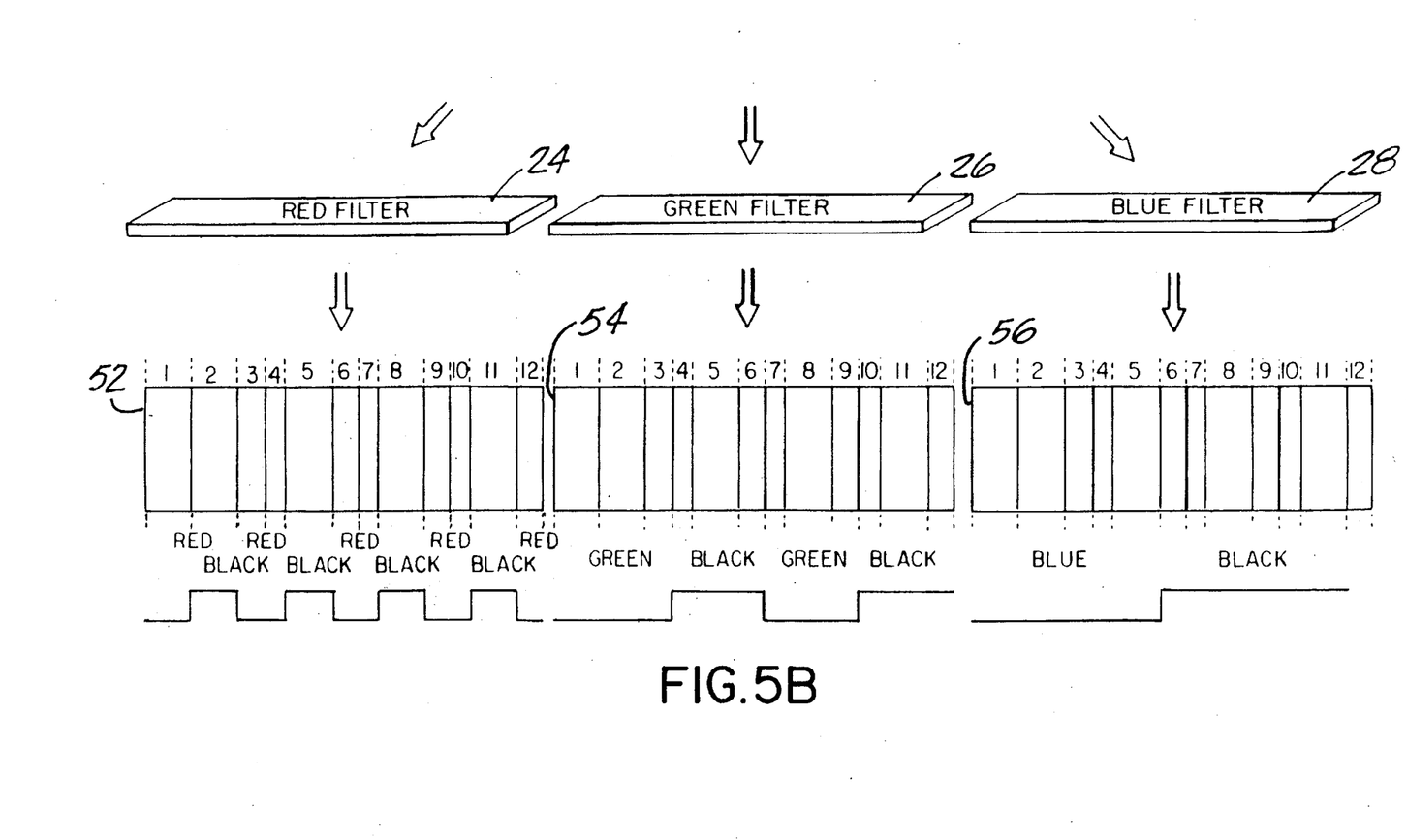

The present invention is especially useful in that the various colored bar codes are first resolved from the aggregate bar code and then decoded by the standard decoder. That is, rather than attempting to decode the entire aggregate bar code with a color-based look up table or the like, each constituent bar code is first filtered and then decoded. This is important since problems in registration of the constituent bar codes by the color printer may result in overlapping colors where not desired and the like. In FIG. 5, a misaligned aggregate bar code is shown to illustrate this feature of the present invention.

Referring to FIG. 5, the constituent bar codes are shown in registration for printing, with MAGENTA BC2 14 misaligned with CYAN BC1 12 and YELLOW BC3 16. Misalignment in printing may occur with defective or inaccurate printing means. The resulting aggregate bar code 50 is shown with twelve sections (1–12) rather than eight as shown with aligned print registration shown in FIG. 3. In particular, sections 3, 6, 9, and 12 have been erroneously added due to the misalignment, and the respective widths of the remaining sections are incorrect. When the misaligned aggregate bar code 50 is scanned by the image scanner 22, however, the red, green and blue filtering passes produce RED/BLACK BAR CODE 52, GREEN/BLACK BAR CODE 54 and BLUE/BLACK BAR CODE 56, which map to the same bar/space patterns as the constituent bar codes. Thus, since the present invention first resolves or filters the aggregate bar code into its primary colors, rather than reading each individual color of the aggregate bar code, the misalignment and resulting extraneous color sections produced thereby does not affect the decoding process. Thus, the constituent bar codes need not be aligned in order to obtain the beneficial results of the present invention.

Although the present invention has been illustrated with respect to constituent bar code symbols which are linear, the present invention is especially advantageous when implemented with the aforementioned PDF417 symbology. The PDF417 symbology was developed in order to store a large amount of data in a relatively small two-dimensional bar code symbol; by using the color compaction methods of the present invention, the information density is tripled. In addition, a further embodiment shown in FIG. 6 allows the density of a single PDF417 symbol to be tripled in accordance with the present invention.

Figure 6:
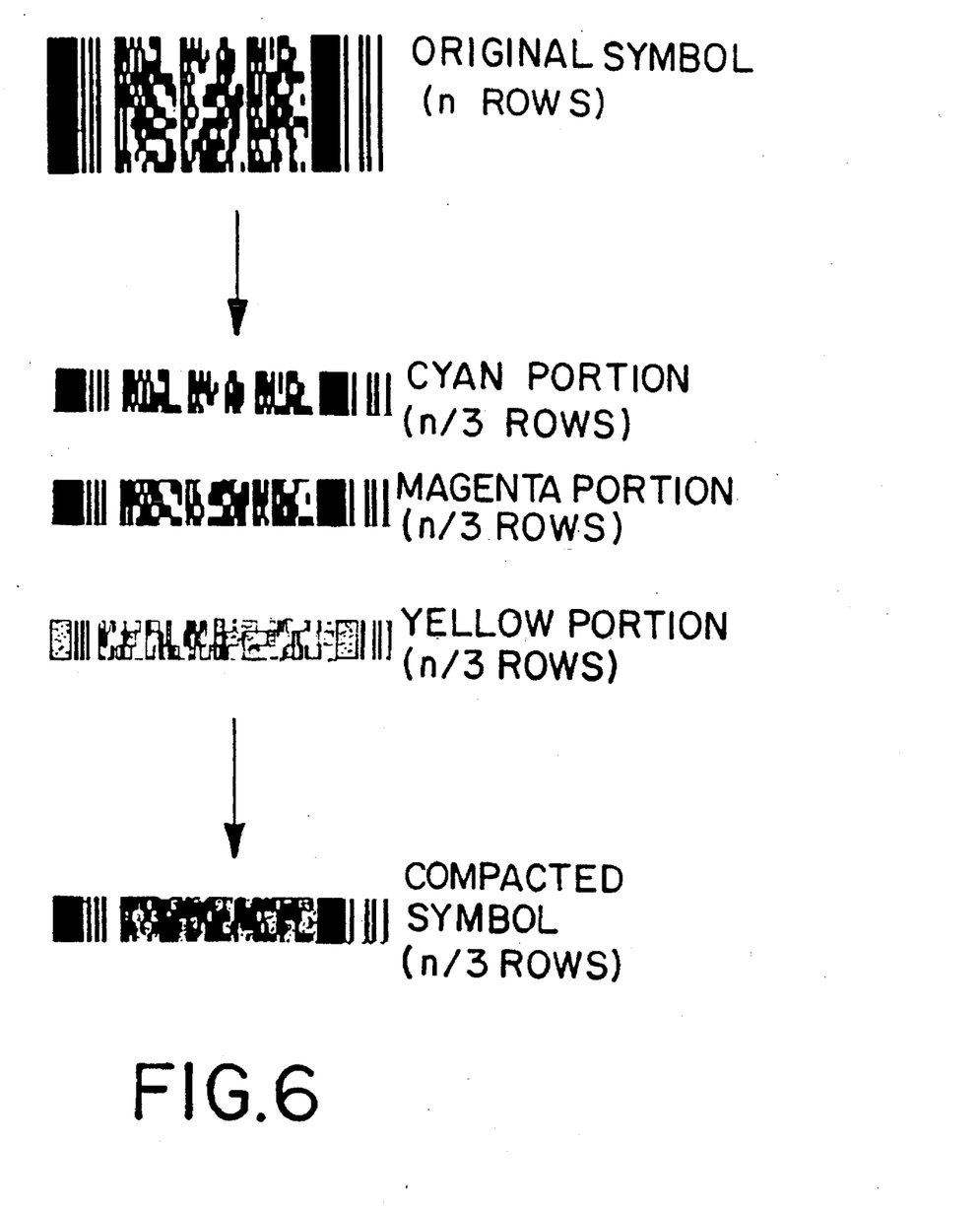
FIG. 6 is an illustration of a single PDF417 symbol being compacted by the color processing techniques of the present invention.

A PDF417 symbol having n rows is illustrated in FIG. 6. The symbol can be logically divided into three portions, with each portion encoded in one of the colors cyan, magenta and yellow. The differently colored portions are overlaid atop each other, with areas of cyan and magenta overlapping to produce the color blue, areas of magenta and yellow overlapping to produce the color red, and areas of yellow and cyan overlapping to produce the color green. As such, the final PDF417 symbol printed is decreased in the vertical dimension by a factor of three, and the density of the single PDF417 symbol has been tripled. For example, if the number of rows of the PDF417 symbol is twelve, rows one through four are encoded in cyan, rows five through eight are encoded in magenta, and rows nine through twelve are encoded in yellow. When the differently colored layers are overlaid each other, a four row multi-colored PDF417 symbol results.

The PDF417 symbol is then scanned and color resolved in accordance with the techniques illustrated herein, and the decoding means reconstitutes the original PDF417 symbol structure by concatenating the red, green and blue bar code maps into a single PDF417 symbol, and then decoding in accordance with standard PDF417 decoding techniques.

Figure 7:
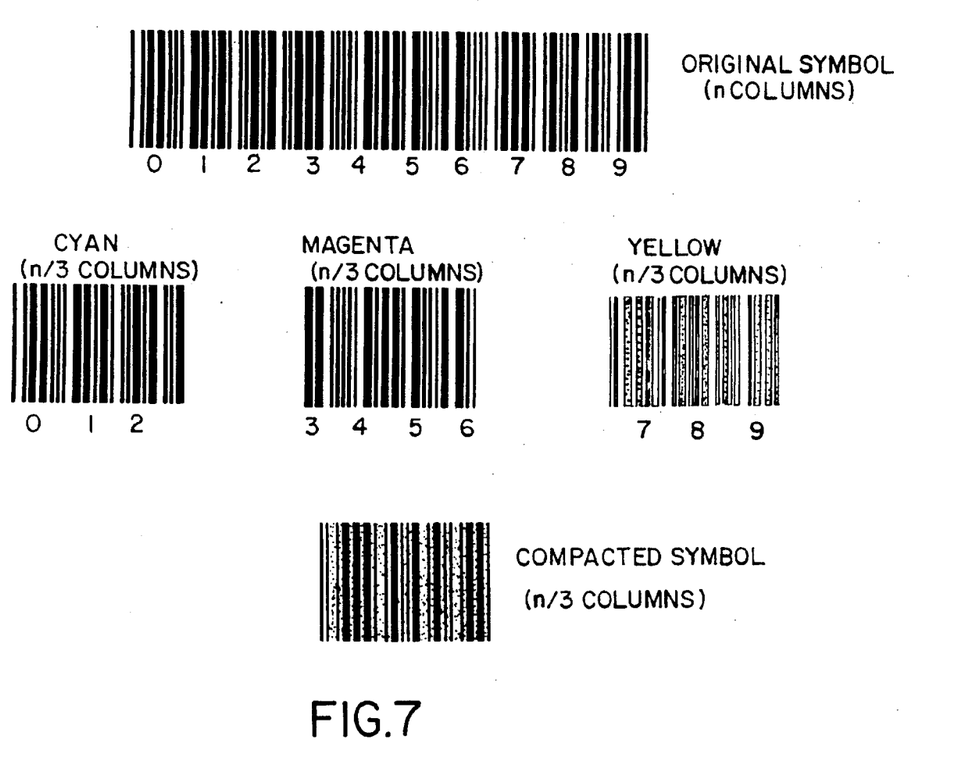
FIG. 7 is a an illustration of a single linear bar code symbol being compacted by the color processing techniques of the present invention.

The same density tripling capabilities of a single PDF417 bar code symbol described herein can be readily applied to any linear bar code by in the horizontal direction. A linear bar code symbol having n columns is illustrated in FIG. 7. The symbol can be logically divided into three portions, with each portion encoded in one of the colors cyan, magenta and yellow. The differently colored portions are overlaid atop each other, with areas of cyan and magenta overlapping to produce the color blue, areas of magenta and yellow overlapping to produce the color red, and areas of yellow and cyan overlapping to produce the color green. As such, the final linear bar code symbol printed is decreased in the horizontal dimension by a factor of three, and the density of the single bar code symbol has been tripled. For example, if the number of columns of the linear bar code symbol is sixty, columns one through twenty are encoded in cyan, columns twenty-one through forty are encoded in magenta, and columns forty-one through sixty are encoded in yellow. When the differently colored layers are overlaid each other, a twenty column multi-colored linear bar code symbol results.

The PDF417 symbol is then scanned and color resolved in accordance with the techniques illustrated herein, and the decoding means reconstitutes the original PDF417 symbol structure by concatenating the red, green and blue bar code maps into a single PDF417 symbol, and then decoding in accordance with standard PDF417 decoding techniques.

We claim:

1. A method of compacting a plurality of constituent bar code symbols into an aggregate bar code symbol capable of being scanned and resolved by an imaging device back into the constituent bar code symbols, said method comprising the steps of a) generating a plurality of constituent bar code symbols, wherein each of said constituent bar code symbols comprises bars and spaces in a pattern indicative of data encoded therein;

b) encoding each of said constituent bar code symbols in a different color; and c) forming an aggregate bar code symbol by overlaying each of said differently colored constituent bar code symbols on top of each other;

whereby a bar of any constituent bar code symbol which overlaps a bar of another constituent bar code symbol forms a section having a color different from any of the colors of each of said constituent bar code symbols.

2. The method of claim 1 in which three constituent bar code symbols are generated, and wherein each of said constituent bar code symbols is printed in cyan, magenta and yellow respectively and the substrate is substantially white in color;

whereby a cyan bar which overlaps a magenta bar produces a blue section of said aggregate bar code symbol, a magenta bar which overlaps a yellow bar produces a red section of said aggregate bar code symbol, a yellow bar which overlaps a cyan bar produces a green section of said aggregate bar code symbol, and a cyan bar which overlaps both a magenta bar and a yellow bar produces a substantially black section of said aggregate bar code symbol.

3. A method of optically imaging a multi-colored aggregate bar code symbol, wherein said aggregate bar code symbol represents multiple constituent bar codes and comprises sections of constituent colors and sections of combined colors resulting from the overlap of said constituent colors, said method comprising the steps of:

a) resolving said aggregate bar code symbol into a first constituent color map, said first constituent color map indicating the locations on said aggregate bar code symbol where a first constituent color is present alone or in combination with another constituent color; and b) repeating step (a) for each other constituent color comprising said aggregate bar code symbol;

whereby each of said constituent color maps resolved in steps (a) and (b) represent a bar/space pattern which is capable of being decoded into corresponding constituent bar codes.

4. The method of claim 3 in which said aggregate bar code symbol represents three constituent bar code symbols, wherein a first constituent bar code symbol is formed with the constituent color cyan, a second constituent bar code symbol is formed with the constituent color magenta, and a third constituent bar code symbol is formed with the color yellow, and in which sections in which the cyan bar code symbol overlaps the magenta bar code symbol produces the combined color blue, sections in which the magenta bar code symbol overlaps the yellow bar code symbol produces the combined color red, sections in which the yellow bar code symbol overlaps the cyan bar code symbol produces the combined color green, and sections in which the cyan bar code symbol overlaps the magenta bar code symbol and the yellow bar code symbol produces the combined color black, and in which the aggregate bar code symbol is resolved into constituent color maps of red spaces and black bars, green spaces and black bars, and blue spaces and black bars.

5. An apparatus for compacting a plurality of constituent bar code symbols into an aggregate bar code symbol capable of being scanned and resolved by an imaging device back into the constituent bar code symbols, said apparatus comprising:

a) means for generating a plurality of constituent bar code symbols, wherein each of said constituent bar code symbols comprises bars and spaces in a pattern indicative of data encoded therein; and b) means for forming an aggregate bar code symbol by printing at substantially the same location on a substrate each of said constituent bar code symbols in a different color;

whereby a bar of any constituent bar code symbol which overlaps a bar of another constituent bar code symbol forms a section having a color different from the colors of each of said constituent bar code symbols.

6. The apparatus of claim 5 in which three constituent bar code symbols are generated, and wherein each of said constituent bar code symbols is printed in cyan, magenta and yellow respectively and the substrate is substantially white in color;

whereby a cyan bar which overlaps a magenta bar produces a blue section of said aggregate bar code symbol, a magenta bar which overlaps a yellow bar produces a red section of said aggregate bar code symbol, a yellow bar which overlaps a cyan bar produces a green section of said aggregate bar code symbol, and a cyan bar which overlaps both a magenta bar and a yellow bar produces a substantially black section of said aggregate bar code symbol.

7. An apparatus for scanning a multi-colored aggregate bar code symbol, wherein said aggregate bar code symbol represents multiple constituent bar codes and comprises sections of constituent colors and sections of combined colors resulting from the overlap of said constituent colors, said apparatus comprising:

a) means for optically imaging said aggregate bar code symbol and resolving said aggregate bar code symbol into multiple constituent color maps, each of said constituent color maps indicating the locations on said aggregate bar code symbol where a constituent color is present alone or in combination with another constituent color; and b) decoding means for converting each of said constituent color maps into data representative of the multiple constituent bar codes.

8. The apparatus of claim 7 in which said aggregate bar code symbol represents three constituent bar code symbols, wherein a first constituent bar code symbol is formed with the constituent color cyan, a second constituent bar code symbol is formed with the constituent color magenta, and a third constituent bar code symbol is formed with the color yellow, and wherein sections in which the cyan bar code symbol overlaps the magenta bar code symbol produces the combined color blue, sections in which the magenta bar code symbol overlaps the yellow bar code symbol produces the combined color red, sections in which the yellow bar code symbol overlaps the cyan bar code symbol produces the combined color green, and sections in which the cyan bar code symbol overlaps the magenta bar code symbol and the yellow bar code symbol produces the combined color black, and wherein said optical imaging means comprises a viewing window for allowing transmission therethrough of light reflected from the aggregate bar code symbol, a photosensor array for capturing an image of the aggregate bar code symbol, a red filter for passing red light, a blue filter for passing blue light, a green filter for passing green light, and means for selectively inserting each of said filters into an optical path extending from the viewing window to the photosensor array such that the aggregate bar code symbol is resolved into constituent color maps of red spaces and black bars, green spaces and black bars, and blue spaces and black bars by the red, green, and blue filters, respectively.

9. A bar code system comprising:

a) means for generating a plurality of constituent bar code symbols, wherein each of said constituent bar code symbols comprises bars and spaces in a pattern indicative of data encoded therein;

b) means for forming an aggregate bar code symbol by printing at substantially the same location on a substrate each of said constituent bar code symbols in a different color, whereby a bar of any constituent bar code symbol which overlaps a bar of another constituent bar code symbol forms a section having a color different from the colors of each of said constituent bar code symbols;

c) means for optically imaging said aggregate bar code symbol and resolving said aggregate bar code symbol into multiple constituent color maps, each of said constituent color maps indicating the locations on said aggregate bar code symbol where a constituent color is present alone or in combination with another constituent color; and d) decoding means for convening each of said constituent color maps into data representative of the multiple constituent bar codes.

10. The bar code system of claim 9 in which three constituent bar code symbols are generated, and wherein each of said constituent bar code symbols is printed in cyan, magenta and yellow respectively and the substrate is substantially white in color, whereby a cyan bar which overlaps a magenta bar produces a blue section of said aggregate bar code symbol, a magenta bar which overlaps a yellow bar produces a red section of said aggregate bar code symbol, a yellow bar which overlaps a cyan bar produces a green section of said aggregate bar code symbol, and a cyan bar which overlaps both a magenta bar and a yellow bar produces a substantially black section of said aggregate bar code symbol; and wherein said optical imaging means comprises a viewing window for allowing transmission therethrough of light reflected from the aggregate bar code symbol, a photosensor array for capturing an image of the aggregate bar code symbol, a red filter for passing red light, a blue filter for passing blue light, a green filter for passing green light, and means for selectively inserting each of said filters into an optical path extending from the viewing window to the photosensor array such that the aggregate bar code symbol is resolved into constituent color maps of red spaces and black bars, green spaces and black bars, and blue spaces and black bars by the red, green, and blue filters, respectively.

11. A method of compacting a standard bar code symbol into a compacted bar code symbol having increased information density and capable of being scanned and resolved by an imaging device back into the standard bar code symbol, said method comprising the steps of a) dividing the standard bar code symbol into a plurality of bar code portions of substantially the same size, b) assigning each of said bar code portions to a different color; and c) forming a compacted bar code symbol by overlaying each of said differently colored bar code portions on top of each other;

whereby a bar of any bar code portion which overlaps a bar of another bar code portion forms a section having a color different from any of the colors of each of said bar code portions.

12. The method of claim 11 in which the standard bar code symbol is divided into three bar code portions, and wherein each of said bar code portions is printed in cyan, magenta and yellow respectively and the substrate is substantially white in color;

whereby a cyan bar which overlaps a magenta bar produces a blue section of said aggregate bar code symbol, a magenta bar which overlaps a yellow bar produces a red section of said aggregate bar code symbol, a yellow bar which overlaps a cyan bar produces a green section of said aggregate bar code symbol, and a cyan bar which overlaps both a magenta bar and a yellow bar produces a substantially black section of said compacted bar code symbol.

13. A method of optically imaging a multi-colored compacted bar code symbol, wherein said compacted bar code symbol represents multiple bar code portions and comprises sections of constituent colors and sections of combined colors resulting from the overlap of said constituent colors, said method comprising the steps of:

a) resolving said compacted bar code symbol into a first constituent color map, said first constituent color map indicating the locations on said compacted bar code symbol where a first constituent color is present alone or in combination with another constituent color;

b) repeating step (a) for each other constituent color comprising said compacted bar code symbol; and c) concatenating each of said bar code portions to form a single combined bar code symbol.

14. The method of claim 13 in which said compacted bar code symbol represents three portions of a standard bar code symbol, wherein a first bar code symbol portion is formed with the constituent color cyan, a second bar code symbol portion is formed with the constituent color magenta, and a third bar code symbol portion is formed with the color yellow, and in which sections in which the cyan bar code symbol portion overlaps the magenta bar code symbol portion produces the combined color blue, sections in which the magenta bar code symbol portion overlaps the yellow bar code symbol portion produces the combined color red, sections in which the yellow bar code symbol portion overlaps the cyan bar code symbol portion produces the combined color green, and sections in which the cyan bar code symbol portion overlaps the magenta bar code symbol portion and the yellow bar code symbol portion produces the combined color black, and in which the compacted bar code symbol is resolved into constituent color maps of red spaces and black bars, green spaces and black bars, and blue spaces and black bars, which color maps are concatenated to form a single combined standard bar code symbol.

15. An apparatus for compacting a standard bar code symbol into a compacted bar code symbol having increased information density, said apparatus comprising:

a) means for dividing the standard bar code symbol into a plurality of bar code portions of substantially the same size, b) means for forming a compacted bar code symbol by printing at substantially the same location on a substrate each of said bar code symbol portions in a different color;

whereby a bar of any bar code symbol portion which overlaps a bar of another bar code symbol portion forms a section having a color different from the colors of each of said bar code symbol portions.

16. The apparatus of claim 15 in which the standard bar code symbol is divided into three bar code symbol portions, and wherein each of said bar code symbol portions is printed in cyan, magenta and yellow respectively and the substrate is substantially white in color;

whereby a cyan bar which overlaps a magenta bar produces a blue section of said aggregate bar code symbol, a magenta bar which overlaps a yellow bar produces a red section of said aggregate bar code symbol, a yellow bar which overlaps a cyan bar produces a green section of said aggregate bar code symbol, and a cyan bar which overlaps both a magenta bar and a yellow bar produces a substantially black section of said aggregate bar code symbol.

17. An apparatus for scanning a multi-colored compacted bar code symbol, wherein said compacted bar code symbol represents multiple bar code symbol portions and comprises sections of constituent colors and sections of combined colors resulting from the overlap of said constituent colors, said apparatus comprising:

a) means for optically imaging said compacted bar code symbol and resolving said compacted bar code symbol into multiple constituent color maps, each of said constituent color maps indicating the locations on said compacted bar code symbol where a constituent color is present alone or in combination with another constituent color;

b) means for concatenating each of said bar code portions to form a single combined bar code symbol; and c) means for decoding said combined bar code symbol.

18. The apparatus of claim 17 in which said compacted bar code symbol represents three portions of a standard bar code symbol, wherein a first bar code symbol portion is formed with the constituent color cyan, a second bar code symbol portion is formed with the constituent color magenta, and a third bar code symbol portion is formed with the color yellow, and wherein sections in which the cyan bar code symbol portion overlaps the magenta bar code symbol portion produces the combined color blue, sections in which the magenta bar code symbol portion overlaps the yellow bar code symbol portion produces the combined color red, sections in which the yellow bar code symbol portion overlaps the cyan bar code symbol portion produces the combined color green, and sections in which the cyan bar code symbol portion overlaps the magenta bar code symbol portion and the yellow bar code symbol portion produces the combined color black, and wherein said optical imaging means comprises a viewing window for allowing transmission therethrough of light reflected from the compacted bar code symbol, a photosensor array for capturing an image of the compacted bar code symbol, a red filter for passing red light, a blue filter for passing blue light, a green filter for passing green light, and means for selectively inserting each of said filters into an optical path extending from the viewing window to the photosensor array such that the compacted bar code symbol is resolved into constituent color maps of red spaces and black bars, green spaces and black bars, and blue spaces and black bars by the red, green, and blue filters, respectively.

19. A bar code system comprising:

a) means for dividing a standard bar code symbol into a plurality of bar code portions of substantially the same size;

b) means for forming a compacted bar code symbol by priming at substantially the same location on a substrate each of said bar code symbol portions in a different color, whereby a bar of any constituent bar code symbol portion which overlaps a bar of another constituent bar code symbol portion forms a section having a color different from the colors of each of said constituent bar code symbol portions;

c) means for optically imaging said compacted bar code symbol and resolving said compacted bar code symbol into multiple constituent color maps, each of said constituent color maps indicating the locations on said compacted bar code symbol where a constituent color is present alone or in combination with another constituent color;

d) means for concatenating each of said bar code portions to form a single combined bar code symbol; and e) means for decoding said combined bar code symbol.

20. The bar code system of claim 19 in which said compacted bar code symbol represents three constituent portions of a standard bar code symbol, wherein each of said constituent bar code symbol portions is printed in cyan, magenta and yellow respectively and the substrate is substantially white in color, whereby a cyan bar which overlaps a magenta bar produces a blue section of said compacted bar code symbol, a magenta bar which overlaps a yellow bar produces a red section of said compacted bar code symbol, a yellow bar which overlaps a cyan bar produces a green section of said compacted bar code symbol, and a cyan bar which overlaps both a magenta bar and a yellow bar produces a substantially black section of said compacted bar code symbol; and wherein said optical imaging means comprises a viewing window for allowing transmission therethrough of light reflected from the compacted bar code symbol, a photosensor array for capturing an image of the compacted bar code symbol, a red filter for passing red light, a blue filter for passing blue light, a green filter for passing green light, and means for selectively inserting each of said filters into an optical path extending from the viewing window to the photosensor array such that the compacted bar code symbol is resolved into constituent color maps of red spaces and black bars, green spaces and black bars, and blue spaces and black bars by the red, green, and blue filters, respectively.

\* \* \* \* \*